United States Patent
Li et al.

(10) Patent No.: US 10,019,990 B2
(45) Date of Patent: Jul. 10, 2018

(54) VARIABLE-COMPONENT DEEP NEURAL NETWORK FOR ROBUST SPEECH RECOGNITION

(71) Applicant: MICROSOFT TECHNOLOGY LICENSING, LLC, Redmond, WA (US)

(72) Inventors: Jinyu Li, Redmond, WA (US); Rui Zhao, Beijing (CN); Yifan Gong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 14/414,621

(22) PCT Filed: Sep. 9, 2014

(86) PCT No.: PCT/CN2014/086121
§ 371 (c)(1),
(2) Date: Jan. 13, 2015

(87) PCT Pub. No.: WO2016/037311
PCT Pub. Date: Mar. 17, 2016

(65) Prior Publication Data
US 2016/0275947 A1    Sep. 22, 2016

(51) Int. Cl.
*G10L 15/20*    (2006.01)
*G10L 15/16*    (2006.01)
(Continued)

(52) U.S. Cl.
CPC ............ *G10L 15/20* (2013.01); *G10L 15/16* (2013.01); *G10L 19/24* (2013.01); *G10L 25/84* (2013.01)

(58) Field of Classification Search
None
See application file for complete search history.

(56) References Cited

U.S. PATENT DOCUMENTS

| 8,145,488 B2 | 3/2012 | Yu et al. |
| 2004/0181409 A1 | 9/2004 | Gong et al. |

(Continued)

FOREIGN PATENT DOCUMENTS

| CN | 103049792 A | 4/2013 |
| CN | 103400577 A | 11/2013 |
| WO | 2013149123 A1 | 10/2013 |

OTHER PUBLICATIONS

Xiaodong, Yifan; A Study of Variable-Parameter Gaussian Mixture Hidden Markov Modeling for Noisy Speech Recognition, Apr. 23, 2007, URL: http://ieeexplore.ieee.org/abstract/document/4156190/.*

(Continued)

*Primary Examiner* — Richa Mishra

(57) ABSTRACT

Systems and methods for speech recognition incorporating environmental variables are provided. The systems and methods capture speech to be recognized. The speech is then recognized utilizing a variable component deep neural network (DNN). The variable component DNN processes the captured speech by incorporating an environment variable. The environment variable may be any variable that is dependent on environmental conditions or the relation of the user, the client device, and the environment. For example, the environment variable may be based on noise of the environment and represented as a signal-to-noise ratio. The variable component DNN may incorporate the environment variable in different ways. For instance, the environment variable may be incorporated into weighting matrices and biases of the DNN, the outputs of the hidden layers of the DNN, or the activation functions of the nodes of the DNN.

20 Claims, 11 Drawing Sheets

(51) Int. Cl.
   *G10L 19/24* (2013.01)
   *G10L 25/84* (2013.01)

(56) References Cited

U.S. PATENT DOCUMENTS

| | | | | |
|---|---|---|---|---|
| 2005/0091050 | A1* | 4/2005 | Surendran | G10L 25/78 704/226 |
| 2013/0138436 | A1 | 5/2013 | Yu et al. | |
| 2013/0138589 | A1 | 5/2013 | Yu et al. | |
| 2014/0142929 | A1 | 5/2014 | Seide et al. | |
| 2014/0214417 | A1* | 7/2014 | Wang | G10L 17/18 704/232 |
| 2015/0340032 | A1* | 11/2015 | Gruenstein | G10L 15/16 704/232 |

OTHER PUBLICATIONS

"International Search Report and Written Opinion Issued in PCT Application No. PCT/CN2014/086121", dated Jun. 3, 2015, 13 Pages.

Su, Rongfeng et al., "Automatic Model Complexity Control for Generalized Variable Parameter HMMS", In Proceedings of IEEE Workshop on Automatic Speech Recognition and Understanding, located at: http://mi.eng.cam.ac.uk/~xl207/publications/conferences/ASRU2013-gvphmm-comctrl.pdf, published Dec. 8, 2013, 6 pgs.

Siniscalchi, Sabato Marco et al., "Hermitian Polynomial for Speaker Adaptation of Connectionist Speech Recognition Systems", In Journal of IEEE Transactions on Audio, Speech and Language Processing, vol. 21, No. 10, located at: http://research.microsoft.com/pubs/198185/tsalpANNadapt.pdf, published Oct. 2003, 10 pgs.

Ning, Cheng et al., "A Flexible Framework for HMM Based Noise Robust Speech Recognition using Generalized Parametric Space Polynomial Regression", Abstract, In Journal of Science China Information Sciences, vol. 54, Issue 12, published Dec. 2011, located at: http://link.springer.com/article/10.1007/s11432-011-4490-6, 4 pgs.

Li, Bo, "Noise-Robust Speech Recognition Using Deep Neural Network", In Thesis of Doctor of Philosophy, located at: http://scholarbank.nus.edu.sg/bitstream/handle/10635/53706/LiB.pdf?sequence=1, retrieved Jun. 20, 2014, 160 pgs.

Yu, Dong et al., "KL-Divergence Regularized Deep Neural Network Adaptation for Improved Large Vocabulary Speech Recognition", n Proceedings of IEEE International Conference on Acoustics, Speech and Signal Processing, obtained at: http://research.microsoft.com/pubs/194346/0007893.pdf, published on May 26, 2013, 5 pgs.

Yu, Dong et al., "Roles of Pretraining and Fine-tuning in Context-dependent DBN-HMMs for Real-world Speech Recognition", In Proceedings of NIPS Workshop on Deep Learning and Unsupervised Feature Learning, obtained at: http://citeseerx.ist.psu.edu/viewdoc/download?doi=10.1.1.224.860&rep=rep1&type=pdf, published Dec. 2010, 8 pgs.

Sainath, Tara N. et al., "Making Deep Belief Networks Effective for Large Vocabulary Continuous Speech Recognition", In Proceedings of IEEE Workshop on Automatic Speech Recognition and Understanding, obtained at: http://citeseerx.ist.psu.edu/viewdoc/download?doi=10.1.1.224.860&rep=rep1&type=pdf, published Dec. 11, 2011, 6 pgs.

Dahl, George E. et al., "Context-dependent Pre-trained Deep Neural Networks for Large-vocabulary Speech Recognition", In Proceedings of IEEE Transactions on Audio, Speech, and Language Processing, vol. 20, No. 1, obtained at: http://research.microsoft.com/pubs/144412/dbn4lvcsr-transaslp.pdf, published Jan. 2012, 13 pgs.

Jaitly, Navdeep et al., "Application of Pretrained Deep Neural Networks to Large Vocabulary Conversational Speech Recognition", In Proceedings of 13th Annual Conference of the International Speech Communication Association, obtained at: http://citeseerx.ist.psu.edu/viewdoc/download?doi=10.1.1.232.3157&rep=rep1&type=pdf, published on Mar. 12, 2012, 11 pgs.

Hinton, Geoffrey, et al., "Deep Neural Networks for Acoustic Modeling in Speech Recognition: The Shared Views of four Research Groups", In IEEE Signal Processing Magazine, vol. 29, No. 6, obtained at: http://www.isip.piconepress.com/courses/temple/ece_8527/lectures/2014_spring/lecture_38_spmag.pdf, published Nov. 2012, 16 pgs.

Deng, Li et al., "Recent Advances in Deep Learning for Speech Research at Microsoft", In Proceedings of IEEE International Conference on Acoustics, Speech, and Signal Processing, obtained at: http://131.107.65.14/pubs/188864/ICASSP-2013-OverviewMSRDeepLearning.pdf, published May 2013, 5 pgs.

Seltzer, Michael L. et al., "An Investigation of Deep Neural Networks for Noise Robust Speech Recognition", In Proceedings of IEEE International Conference on Acoustics, Speech, and Signal Processing, obtained at: http://msr-waypoint.com/pubs/194344/0007398.pdf, published on May 26, 2013, 5 pgs.

Li, Bo et al., "Noise Adaptive Front-end Normalization based on Vector Taylor Series for Deep Neural Networks in Robust Speech Recognition", In Proceedings of IEEE International Conference on Acoustics, Speech and Signal Processing, obtained at: http://ieeexplore.ieee.org/stamp/stamp.jsp?arnumber=06639102, published on May 26, 2013, 5 pgs.

Li, Bo et al., "An Investigation of Spectral Restoration Algorithms for Deep Neural Networks based Noise Robust Speech Recognition", In Proceedings of 14th Annual Conference of the International Speech Communication Association, obtained at: https://www.comp.nus.edu.sg/~li-bo/papers/is13_dnnenhance.pdf, published on Aug. 25, 2013, 5 pgs.

Cui, Xiaodong et al., "A Study of Variable-parameter Gaussian Mixture Hidden Markov Modeling for Noisy Speech Recognition", In Proceedings of IEEE Transactions on Audio, Speech, and Language Processing, vol. 15, No. 4, obtained at: http://ieeexplore.ieee.org/stamp/stamp.jsp?tp=&arnumber=4156190, published May 2007, 11 pgs.

Yu, Dong et al., "A Novel Framework and Training Algorithm for Variable-parameter Hidden Markov Models", In Proceedings of IEEE Transactions on Audio, Speech, and Language Processing, vol. 17, No. 7, obtained at: http://research.microsoft.com/pubs/81512/VPHMM-TSAL-Published.pdf?origin=publication_detail, published Sep. 2009, 13 pgs.

Cheng, Ning, et al., "Generalized Variable Parameter HMMs for Noise Robust Speech Recognition", In Proceedings of 12th Annual Conference of the International Speech Communication Association, obtained at: http://mi.eng.cam.ac.uk/~xl207/publications/conferences/IS2011-gvphmm.pdf, published on Aug. 27, 2011, 4 pgs.

Radenen, Mathieu et al., "Contextual Hidden Markov Models", In Proceedings of IEEE International Conference on Acoustics, Speech and Signal Processing, obtained at: http://www.mirlab.org/conference_papers/International_Conference/ICASSP%202012/pdfs/0002113.pdf, published on Mar. 25, 2012, 4 pgs.

Li, Yang et al., "Feature Space Generalized Variable Parameter HMMs for Noise Robust Recognition", In Proceedings of 14th Annual Conference of the International Speech Communication Association, obtained at: http://mi.eng.cam.ac.uk/~xl207/publications/conferences/IS2013-fgvphmm.pdf, published on Aug. 25, 2013, 5 pgs.

Lippmann, Richard P. et al., "Multi-style Training for Robust Isolated-word Speech Recognition", In Proceedings of IEEE International Conference on Acoustics, Speech, and Signal Processing, obtained at: http://ieeexplore.ieee.org/stamp/stamp.jsp?tp=&arnumber=1169544, published Apr. 1987, 4 pgs.

Cheng, Yan Ming et al., "A Robust Front-End Algorithm for Distributed Speech Recognition", In Proceedings of 7th European Conference on Speech Communication and Technology, obtained at: http://www.mirlab.org/conference_papers/International_Conference/Eurospeech%202001/papers/page425.pdf, published on Sep. 3, 2001, 4 pgs.

Parihar, N., et al., "Aurora Working Group: DSR front end LVCSR evaluation AU/384/02", : In Proceedings of Institute for Signal and Information Processing, obtained at: http://www.isip.piconepress.

(56) References Cited

OTHER PUBLICATIONS com/publications/reports/2002/aurora/frontend/report_012202_v20.pdf, published on Jan. 31, 2002, 53 pgs.

Delcroix, M. et al., "Is speech enhancement pre-processing still relevant when using deep neural networks for acoustic modeling," in Proc. Interspeech, pp. 2992-2996, 2013.

Blanchet, M. et al., "Environment adaptation for speech recognition in noise," in Proc. EUSIPCO, 1992, pp. 391-394.

PCT International Preliminary Report on Patentability in International Application PCT/US2014/086121, dated Mar. 23, 2017, 5 pgs.

European Communication and Search Report in Application 14901500.0, dated Jul. 24, 2017, 4 pages.

Li, Jinyu et al., "Factorized adaptation for deep neural network", 2014 IEEE Int'l. Conference on Acoustics, Speech and Processing (ICASSP), IEEE, May 4, 2014, pp. 5537-5541, retrieved on Jul. 11, 2014.

"Office Action Issued in European Patent Application No. 14901500.0", dated Sep. 20, 2017, 6 Pages.

\* cited by examiner

VARIABLE-COMPONENT DEEP NEURAL NETWORK FOR ROBUST SPEECH RECOGNITION

This application is a National Stage Application of PCT/CN2014/086121, filed 9 Sep. 2014, which application is incorporated herein by reference. To the extent appropriate, a claim of priority is made to the above disclosed application.

BACKGROUND

Speech recognition and applications utilizing speech recognition technology have become common and continue to grow in popularity. Many of these applications are also being incorporated into personal computers, laptops, mobile devices, as well as other similar types of devices. These devices are often located in different places or are moved from one place to another. As such, the background noise and other environmental factors will be different depending on the location. Some of these environmental factors have an effect on the quality and consistency of speech recognition. As such, as the user uses speech recognition applications in different locations, the quality of the recognized speech is often of poor or inconsistent quality.

It is with respect to these and other general considerations that embodiments have been made. Also, although relatively specific problems have been discussed, it should be understood that the embodiments should not be limited to solving the specific problems identified in the background.

SUMMARY

The technology relates to systems and methods for speech recognition incorporating environmental variables. The systems and methods capture speech to be recognized, such as speech from a user. The speech is then recognized utilizing a deep neural network (DNN), more specifically a variable component DNN (VCDNN). The VCDNN processes and recognizes the captured speech by incorporating an environment variable. The environment variable may be any variable that is dependent on environmental conditions or the relation of the user, the client device, and the environment. For example, the environment variable may be based on noise of the environment. One such environment variable may be a signal-to-noise ratio. Other environment variables may also include the user's distance from a speech capture device, the user's speaking rate, the vocal tract length of the speaker, the angle from which the speech is received from the user, the user's age, or other similar variables. The environment variable may be measured concurrently with the user speaking.

The VCDNN may incorporate the environment variable in different ways, and almost any component of the DNN may be modeled as a set of functions, such as polynomial functions, of the environment variable. For instance, a variable-parameter DNN (VPNN) may be utilized where the weighting matrix component and the bias component are environment-variable dependent. In another example, a variable-output DNN (VODNN) may be utilized where the output of each hidden layer is environment-variable dependent. In yet another example, a variable-activation DNN (VADNN) may be utilized where a parameter of the activation function in the DNN nodes are modeled as environment-variable dependent. In each example, the variable-dependent components may be computed for the environment condition detected in the testing or measured data using their associated polynomial functions during recognition. By incorporating the environment variable into the DNN in such ways, high quality speech recognition results may be achieved across multiple different environments.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
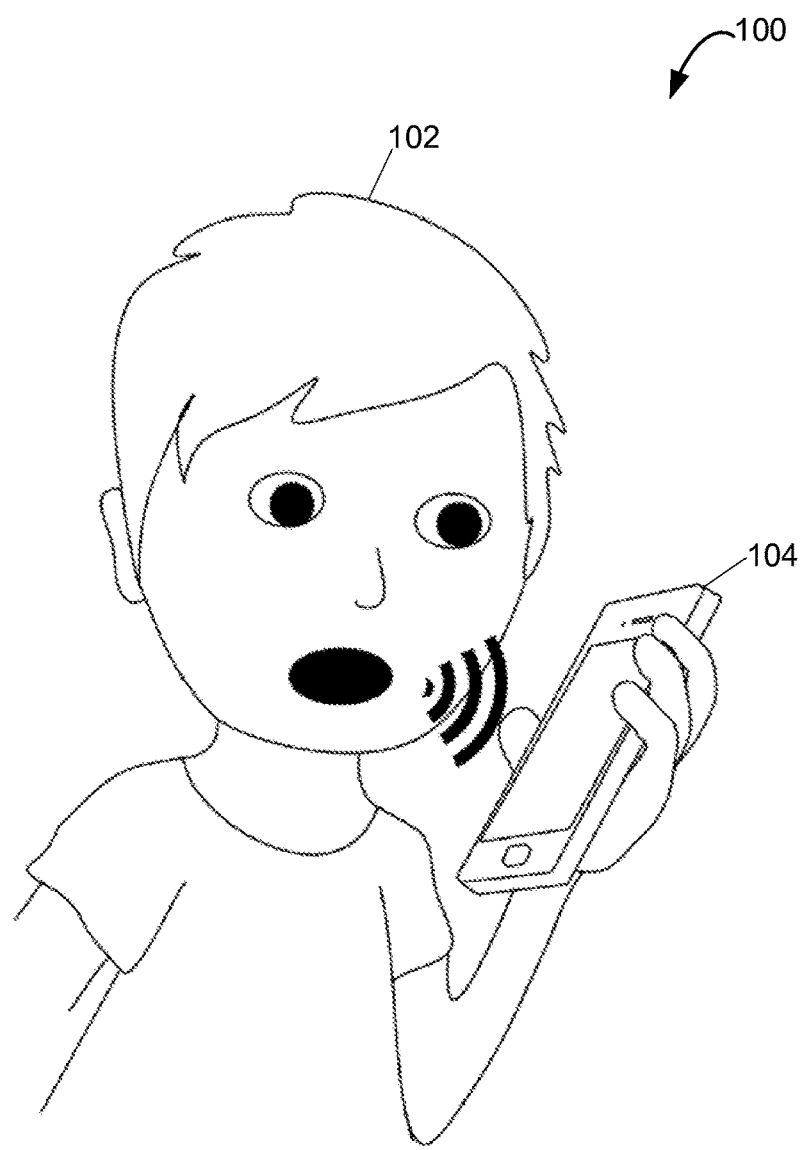
FIG. 1 depicts an environment for speech recognition.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure generally relates to improving the robustness of speech recognition. In part, the present disclosure relates to improving speech recognition across multiple environments. For example, the quality of speech recognition results often varies across quiet environments and noisy environments. The present disclosure provides for systems and methods that provide higher quality results across the multiple environments by incorporating environment variables into components of a deep neural network (DNN) for use in speech recognition systems. Such speech recognition systems and methods may be referred to herein as "noise-robust" speech recognition systems and methods.

Previous attempts to create noise-robust speech recognition systems, while progressively better than their predecessors, have still left room for improvement. For instance, systems utilizing a context-dependent deep neural network hidden Markov model (CD-DNN-HMM) have shown superiority over the traditional Gaussian mixture model (GMM-HMM) in automatic speech recognition. For both DNN- HMM and GMM-HMM systems, one model-based noise-robust method is to include noisy speech under various conditions to the training data, which is referred to as multi-condition training. The multi-condition training with past GMM-HMM and DNN-HMM, however, suffers from several limitations. For example, the various training environments are modelled with a fixed set of parameters, leading to "flat" distributions, which are less useful in distinguishing environments. As such, for recognizing speech in a particular environment, the "flat" model is not the optimal matched model. Also, it is often difficult to collect training data to cover all possible types of environments, leaving performance on unseen noisy environments unpredictable.

Variable-parameter HMM (VPHMM) systems sought to solve these limitations, but still have their own limitations. In VPHMM-based speech recognition, HMM parameters, such as state emission parameters (GMM mean and variance) or adaptation matrices, are modelled as a polynomial function of a continuous environment-dependent variable. At the recognition time, a set of GMM means and variances (or adaptation matrices) specific to the given value of the environment variable is instantiated and used for recognition. Even if the testing environment is not seen in the training, the estimated GMM parameters may still work because the change of means and variances in terms of the environment variable can be predicted by polynomials.

Improvements over these prior methods, however, are possible and discussed in the present disclosure. More specifically, the present disclosure relates to a model-based noise-robust speech recognition systems referred to as variable-component DNN (VCDNN)-based speech recognition systems. With VCDNN-based speech recognition, almost any component in the DNN may be modeled as a set of polynomial functions of an environment variable. As one example, a variable-parameter DNN (VPNN) may be utilized where the weighting matrix component and the bias component are environment-variable dependent. In another example, a variable-output DNN (VODNN) may be utilized where the output of each hidden layer is environment-variable dependent. In yet another example, a variable-activation DNN (VADNN) may be utilized where a parameter of the activation function in the DNN nodes are modeled as environment-variable dependent. In each example, the variable-dependent components may be computed for the environment condition detected in the testing or measured data using their associated polynomial functions during recognition.

Turning to FIG. 1, FIG. 1 depicts an environment 100 including a user 102 and a client device 104. The user 102 in environment 100 speaks into the client device 104. Upon receiving the speech from the user 102, the client device 104 completes the speech recognition utilizing VCDNN-based speech recognition, as discussed in more detail below. Further, as clarified below, the speech recognition utilizing a VCDNN may be performed, at least in part, with additional devices or applications, such as servers or cloud-based applications.

The environment 100 may change as the user 102 accesses a separate client device such as a laptop computer or personal computer. The environment 100 may also change as the user 102 changes location or as the environment 100 changes around the user 102. For instance, the client device 104 may be a mobile device such as a smartphone. The user 102 may desire to have a speech recognition function on the client device 104 performed in multiple environments. For example, the user may be on a noisy street attempting to have a speech recognition function performed on the client device 104. Later, the user may be in a quiet office attempting to have a speech recognition function performed on the client device. Due to the utilization of VCDNN in the speech recognition process, the user 102 will receive higher quality results over both environments.

Figure 2:
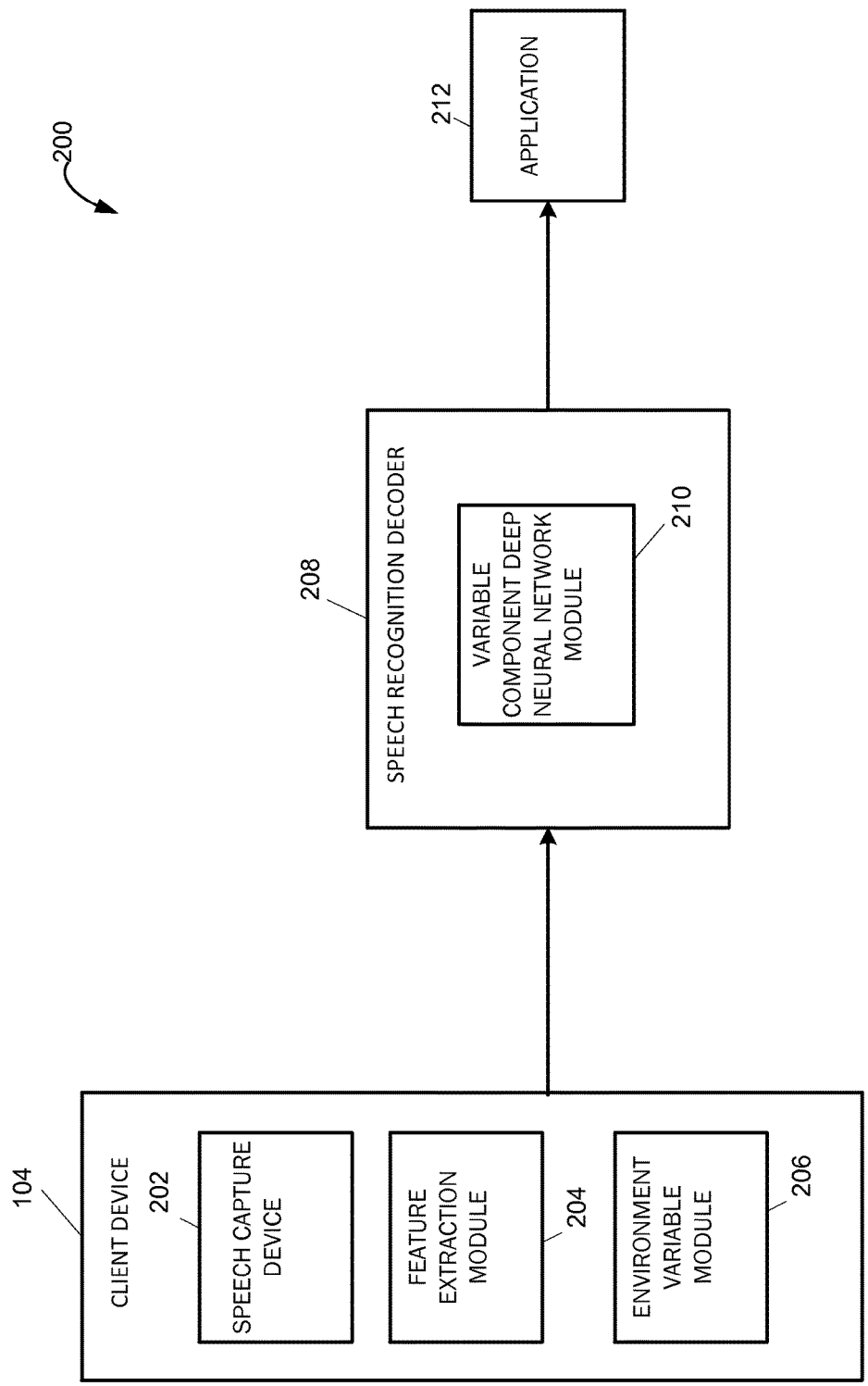
FIG. 2 depicts a system for speech recognition.

FIG. 2 depicts a system 200 for noise-robust speech recognition. FIG. 2 illustrates a more detailed view the client device 104, a speech recognition decoder 208, and an application 212. The client device 104 may include a speech capture device 202, a feature extraction module 204, and an environment variable module 206. The speech capture device 202 captures the speech uttered by the user 102. The speech capture device 202 may be a combination of hardware and software components, such as a microphone and digitizing software, among other well-known speech capture devices. In embodiments, feature vectors may also be extracted by the feature extraction module 204. The feature vectors may be set of n-dimensional vectors of numerical features representing the speech input. Multiple acceptable methods for extracting feature vectors are known to those having skill in the art, including the log-Mel-filter-bank, Mel-frequency cepstral technique, linear prediction, and perceptual linear prediction, among others. In such embodiments, the feature vectors are extracted from the speech input captured by speech capture device 202. The feature vectors are then sent to the speech recognition decoder 208.

The environment variable module 206 determines the environment variable and the environment variable value to be used in the VCDNN. The environment variable may be any variable that is dependent on environmental conditions or the relation of the user, the client device, and the environment. For example, the environment variable may be based on noise of the environment. One such environment variable is a signal-to-noise ratio (SNR). Other environment variables include speaking rate or distance from the speech capture device 202. Where the VCDNN utilizes the SNR as the environment variable, the environment variable module 206 calculates, measures, and/or determines the SNR during speech capture. The SNR may be determined by measuring the noise for each speech frame. The measured noise may be compared or subtracted from the captured speech to determine the SNR. The determined SNR may then be utilized by the VCDNN. In examples where the speaking rate is utilized as the environment variable, the speaking rate may be calculated or determined directly from the captured speech. In examples where distance from the microphone is utilized, that distance may be determined by video analysis or other distance measuring tools, such as laser or light based measurement. Another environment variable may be the angle from which the speech is received from the user. The angle may be determined in a similar fashion as the distance of the user. Characteristics about the user may also be utilized as the environment variable. For instance, the environment variable may be the speaker's age. Other environment variables may also include the vocal tract length of the speaker. In embodiments, the environment variable is any scalar value that may be measured at run-time that could have a potential effect on the speech recognition results.

Each of the environment variables may be continuously, or substantially continuously, measured. The current environment variable may be measured as a scalar value. For example, the value of the signal-to-noise ratio is a scalar value when measured. As such, the environment variables are suitable for approximation and incorporation into polynomial functions among other functions. One having skill in the art will appreciate that there are additional ways to measure or determine the above environment variables.

The speech recognition decoder 208 recognizes the speech uttered by the user 102. The speech recognition decoder utilizes a VCDNN module 210 to complete the recognition. In some examples, the VCDNN module 210 may be incorporated into or used in conjunction with an acoustic model of the speech recognition decoder 208. The VCDNN module receives the captured speech or feature vectors and processes the speech or vectors utilizing the respective VCDNN, such as a VPDNN, a VODNN, or a VADNN. The VCDNN also incorporates the value of the environment variable. One or more of the VCDNN components may be parameterized as a function of the scalar value. The operation of the respective VCDNN is discussed in further detail below.

The output of the VCDNN module may be further processed by the speech recognition decoder 208. For example, the speech recognition decoder may further include a language model, a phonetic model, and/or a lexicon, among other models or automatic speech recognition components. Each of those models may be further utilized to recognize the speech uttered by the user 102. Upon recognition of the uttered speech, the speech recognition decoder 208 outputs the recognized speech. The recognized speech output may be sent to an application 212 for use. The application 212 may be any application capable of receiving input in the form of recognized speech. For example, the application 212 may be a speech-to-text application, such as a messaging application or a component thereof. The application 212 may also be part of an intelligent personal assistant such as the CORTANA intelligent personal assistant from the Microsoft Corporation of Redmond, Wash.

While depicted as occurring across multiple devices, the functionalities of the system 200 may be performed on a single device or across multiple devices, such as a client and server. For example, when using multiple devices, the speech capture device 202 may be on the client device 104, and the feature extraction module 204 may also be executed by the client device 104. In such an example, the speech recognition decoder 208 may operate on a server or other network or cloud-based component. The application 212 may also reside in either the client or server. By having the speech recognition decoder 208 operate on a server, more resources may be used in the decoding and recognition process. In other examples, all functionality except for capturing speech input may be accomplished by the server or other network or cloud-based component. Alternatively, all features may be performed by one device, such as the client device 104. One having skill in the art will also recognize other architectures for automatic speech recognition suitable for use with the methods and systems disclosed herein.

Figure 3:
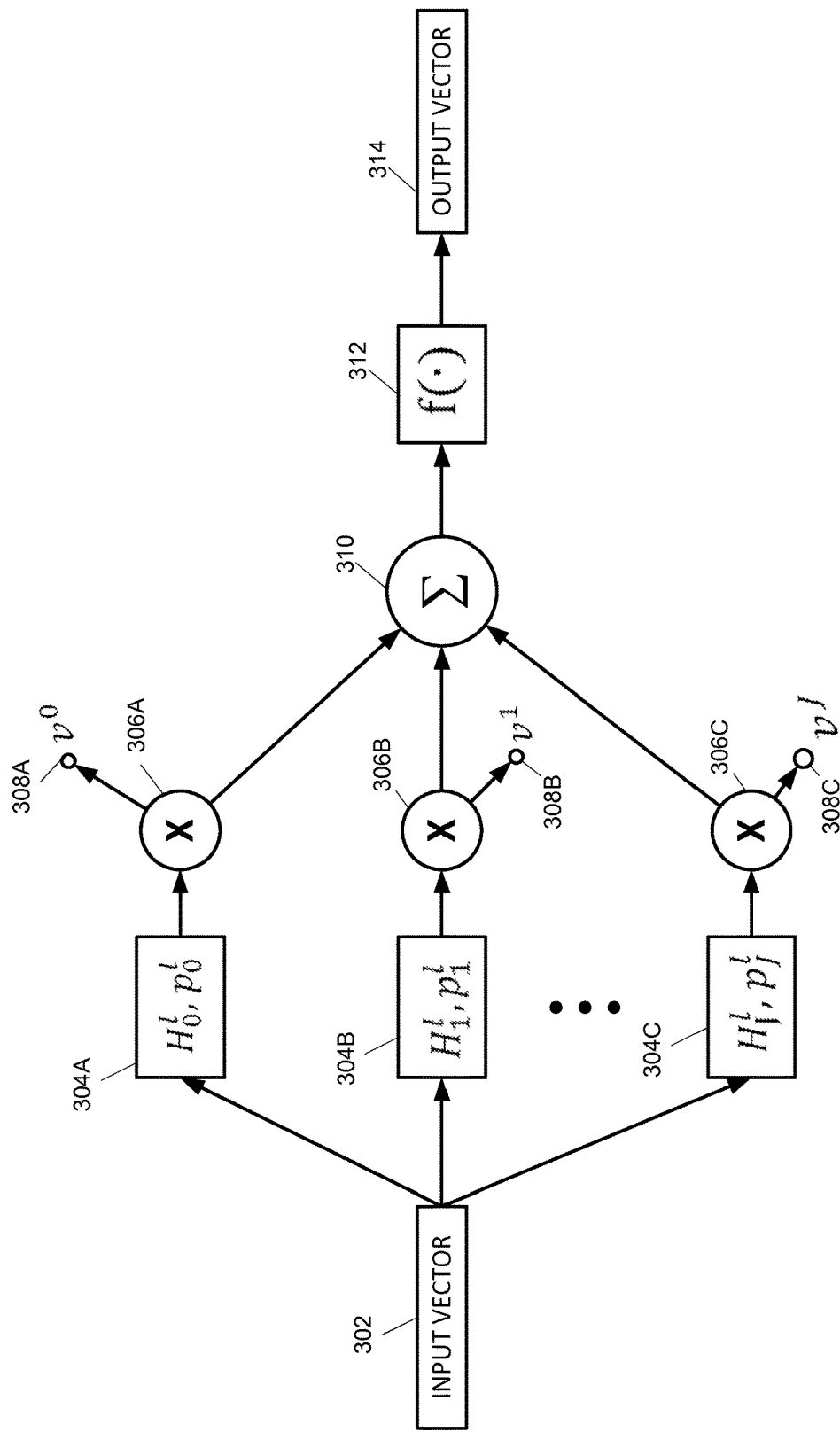
FIG. 3 illustrates a flowchart of one layer in a VPDNN.

FIG. 3 illustrates a flowchart of one layer in a VPDNN utilized in VPDNN-based speech recognition. Prior to discussing the flowchart illustrated in FIG. 3, a general background of CD-DNN-HMM and VPHMM may be useful in understanding the present disclosure. In the framework of CD-DNN-HMM, the log likelihood of tied context dependent HMM states (referred to herein as "senone") is calculated using a DNN instead of a GMM in the conventional GMM-HMM systems. A DNN may be considered as a multi-layer perceptron (MLP) consisting of one input layer, one output layer and many hidden layers. Each node in the output layer represents one senone.

A sigmoid function may be chosen as the activation function for hidden layers of a DNN and the output of the l-th hidden layer $o^l$ may be given by:

$$o^l = f_{sigm}(u^l) \qquad (1)$$

$$u^l = (W^l)^T o^{l-1} + b^l \qquad (2)$$

where $o^{l-1}$ is the input of the l-th layer, $W^l$ and $b^l$ are the weighting matrix and bias of the l-th layer, respectively, where $f_{sigm}(x) = 1/(1+e^x)$.

The activation function of the output layer (layer L) is a softmax function:

$$O_k^L = \frac{\exp(u_k^L)}{\sum_{i=1}^{S} \exp(u_i^L)} \qquad (3)$$

Hence, the senone posterior probability $P(s_k|x)$ is:

$$P(s_k | x) = \frac{\exp(u_k^L)}{\sum_{i=1}^{S} \exp(u_i^L)} \qquad (4)$$

where x is the input feature vector of the DNN, $s_k$ is the senone responding to unit k of top layer, and S is the total number of senones. The first layer's input $o^0 = x$. The senone emission likelihood of HMM p(x|s) is then calculated according to $$p(x|s) = P(s|x) \cdot p(x)/p(s) \qquad (5)$$

P(s) is the prior probability of senone s. p(x) may be independent of s and can be ignored during HMM decoding.

In DNN training, one optimization criterion that may be used is the cross-entropy between the posterior distribution represented by the reference labels $\hat{p}(s|x)$ and the predicted distribution p(s|x). The objective function is:

$$F_{CE} = -\Sigma_{i=1}^{S} \hat{p}(s_i|x) \log(p(s_i|x)) \qquad (6)$$

The reference label is typically decided based on the forced-alignment results:

$$\hat{p}(s_i | x) = \begin{cases} 1 & \text{if } x \text{ is aligned to } \textit{seone } s_i \\ 0 & \text{else} \end{cases} \qquad (7)$$

Then equation (6) may be simplified as:

$$F_{CE} = -\log(p(s'|x)) \qquad (8)$$

where s' the reference senone for the speech input x.

With the above objective function, the DNN may be trained with the method introduced in D. Yu, L. Deng, and G. Dahl, "Roles of pretraining and fine-tuning in context-dependent DBN-HMMs for real-world speech recognition," in *Proc. NIPS Workshop on Deep Learning and Unsupervised Feature Learning*, 2010, which consists of unsupervised pre-training and supervised fine-tuning. Other training methods may also be utilized. The algorithm used in the fine-tuning stage may be error back propagation, where the weighting matrix W and bias b of layer l are updated with:

$$\hat{W}^l = W^l + \alpha o^{l-1}(e^l)^T \qquad (9)$$

$$\hat{b}^l = b^l + \alpha e^l \qquad (10)$$

α represents the learning rate. $o^{l-1}$ and $e^l$ are the input and error vector of layer l respectively. $e^l$ may be calculated by propagating the error from its upper layer:

$$e_i^l = [E_{k=1}^{Nl+1} w_{ik}^{l+1} e_k^{l+1}] f_{sigm}'(u_i^l) \tag{10}$$

$w_{ik}^{l+1}$ is the element of weighting matrix $W^{l+1}$ in i-th row and k-th column for layer l+1, and $e_k^{l+1}$ is the k-th element of error vector $e^{l+1}$ for layer l+1. $N_{l+1}$ is the units number in layer l+1. The error of the top layer (i.e. output layer) may be the derivative of the objective function defined in equation (8).

$$e_s^L = -\frac{\partial F_{CE}}{\partial u_s^L} = (\delta_{ss'} - o_s^L) \tag{12}$$

$\delta_{ss'}$ is the Kronecker delta function.

In traditional GMM-HMM systems, the speech distribution under different environments is modelled by the same set of parameters (Gaussian mean and variance). As such, the traditional GMM-HMM is imperfect because it does not model any acoustic environment changes, such as SNR. VPHMM attempts to model the GMM parameters as a function of SNR, i.e., the Gaussian component m is modeled as N(y; μ(m, v), Σ(m, v)). μ(m, v) and Σ(m, v) are polynomial functions of environment variable v. For example, μ(m, v) can be denoted by $$\mu(m,v) = \Sigma_{j=0}^J c_j(m) v^j \tag{13}$$

where $c_j(m)$ is a vector with the same dimension as the input feature vector and corresponds to the j-th order environment variable. The choice of a polynomial function is based on its good approximation property to continuous functions, its simple derivation operations, and the fact that the change of means and variances in terms of the environment is smooth and can be modeled by low order polynomials. Additional function types may also be utilized.

In the training of a VPHMM, $c_j(m)$ (and other parameters) may be estimated based on the maximum likelihood criterion with the EM algorithm. In the testing stage, the Gaussian mean and variance are calculated with the determined SNR value. Even if the determined SNR was not seen in the training, the polynomial function may help to calculate appropriate model parameters, so VPHMM-based speech recognition is able to work better than its predecessors in unseen environments.

Turning back to FIG. 3 and the VCDNN, VCDNN-based speech recognition represents the DNN components by modeling their variation against the environment, which is not taken into consideration in a standard DNN. In VPDNN-based speech recognition, as illustrated in the flowchart in FIG. 3, the weighting matrix W and bias b of layer l is modeled as a function of environment variable v:

$$W^l = f_w^l(v), b^l = f_b^l(v) \, 0 < l \leq L \tag{14}$$

Here, a polynomial function for both $f_w^l$ and $f_b^l$ may be used. SNR may be selected as the environment variable, among the other environment variables discussed above. The following equations thus result:

$$W^l = \Sigma_{j=0}^J H_j^l v^j \, 0 < l \leq L \tag{15}$$

$$b^l = \Sigma_{j=0}^J p_j^l v^j \, 0 < l \leq L \tag{16}$$

J is the polynomial function order. $H_j^l$ is a matrix with the same dimensions as $W^l$, and $p_j^l$ is a vector with the same dimension as $b^l$.

The flowchart of one layer of a VPDNN is shown in FIG. 3. An input vector 302 is received by the weighting functions, represented by weighting function indicators 304A-C, respectively. While only three weighting functions are depicted, the number of weighting functions in such a depiction is dependent on the selected polynomial order, J, as indicated in the weighting function indicator 304C. Each represented weighting function indicator 304A-C, respectively, represents an evaluation at a particular j value from j=0 to j=J in the summation represented in equations (15) and (16). Following the weighting functions, the results of the weighting functions are multiplied, as indicated by multiplication indicators 306A-C, by the jth power of respective environment variable v (e.g. $v^j$), as indicated the environment variable indicators 306A-C. The results from each level, from j=0 to j=J, are then summed, as indicated by summation indicator 310. The summed results are received by the activation function represented by activation function indicator 312. Following evaluation of the activation function, an output vector 314 is produced. As will be appreciated by those having skill in the art, FIG. 3 illustrates only one layer in the VPDNN, and, in embodiments, many additional layers are utilized.

In the training of VPDNN-based speech recognition systems, $H_j^l$ and $p_j^l$ are determined instead of $W^l$ and $b^l$ in standard DNN. From equations (15) and (16) it can be seen that if J is set to zero (J=0), VPDNN is equivalent to standard DNN, so it is unnecessary to determine $H_j^l$ and $p_j^l$ from scratch. $H_j^l$ and $p_j^l$ may be updated based on a standard DNN in the fine-tuning stage, with the initial values as follows:

$$H_0^l = W_{sta}^l \tag{17}$$
$$p_0^l = b_{sta}^l$$

$$H_j^l = 0 \tag{18}$$
$$p_j^l = 0$$
$$j > 1$$

$W_{sta}^l$ and $b_{sta}^l$ are weighting matrix and bias of the layer l in a standard DNN.

Combining equations (15) and (16) and the error back propagation algorithm discussed above, the updating formulas for $H_j^l$ and $p_j^l$ may be determined:

$$\hat{H}_j^l = H_j^l + \alpha o^{l-1} (e^l)^T v^j \tag{19}$$

$$\hat{p}_j^l = p_j^l + \alpha e^l v^j \tag{20}$$

In the recognition stage, the weighting matrix W and bias b of each layer are instantiated according to equations (15) and (16) with the estimated, calculated, or measured environment variable, e.g., SNR. The senone posterior may be calculated in the same way as in standard DNN.

Figure 4:
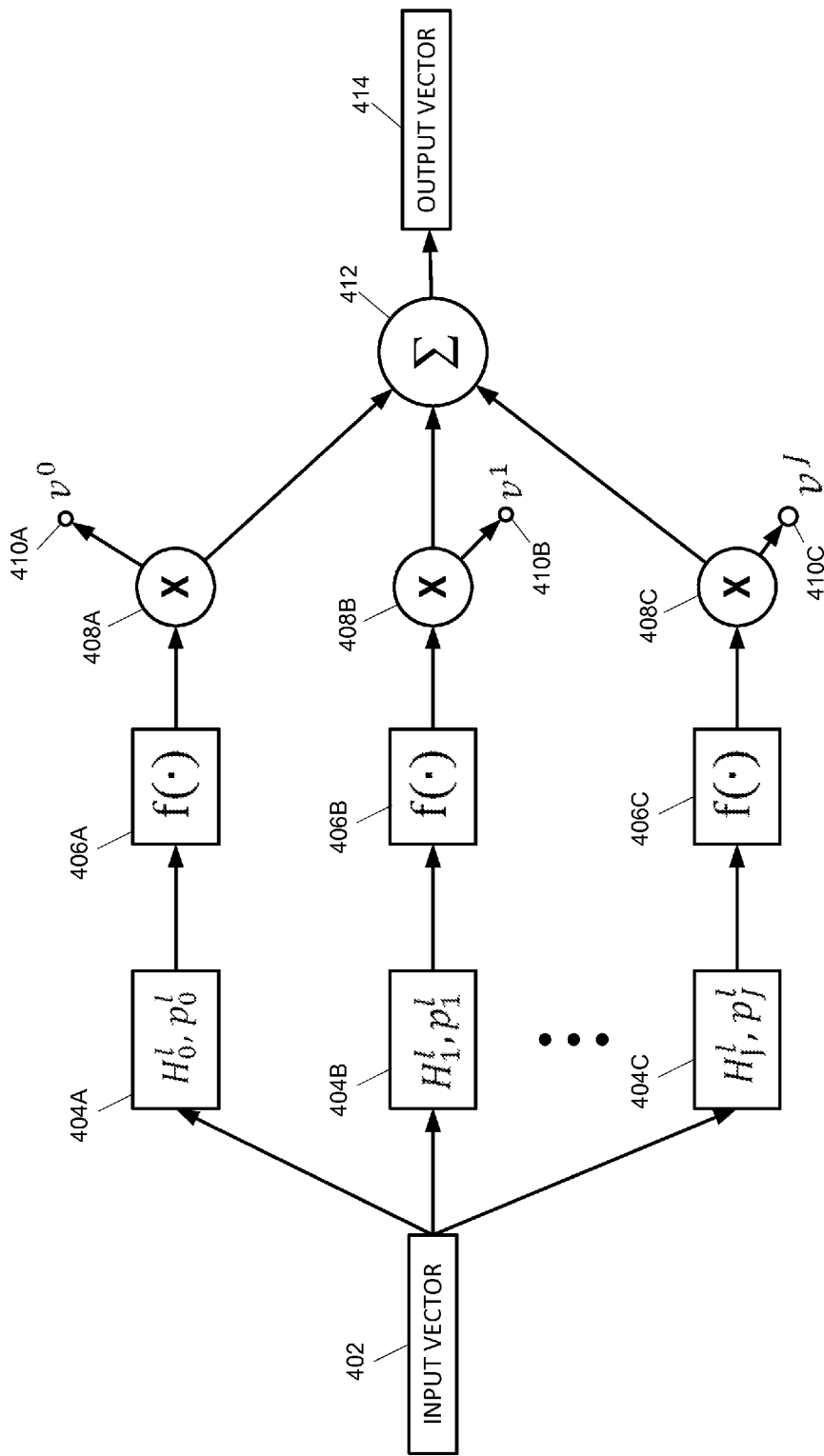
FIG. 4 illustrates the framework of one layer in a VODNN.

FIG. 4 illustrates the framework of one layer in a VODNN. In VODNN-based speech recognition, the output of each hidden layer is described by a function, such as a polynomial function, of environment variable v.

$$o^l = \Sigma_{j=0}^J f_{sigm}(u_j^l) v^j \, 0 < l < L \tag{21}$$

where $$u_j^l = (H_j^l)^T o^{l-1} + p_j^l \, 0 < l < L \tag{22}$$

As in VPDNN-based speech recognition, $H_j^l$ and $p_j^l$ are updated based on a standard DNN with the same initial values given in equations (17) and (18). Similarly, the updating formulas may be obtained by combining equations (21) and (22) and error back propagation algorithm:

$$\hat{H}_j^l = H_j^l + \alpha o^{l-1}(e_j^l)^T v^j \quad (23)$$

$$\hat{p}_j^l = p_j^l + \alpha e_j^l v^j \quad (24)$$

where $$e_{i(j)}^l = [\Sigma_{n=0}^J \Sigma_{k=1}^{Nl+1} h_{ik(n)}^{l+1} e_{k(n)}^{l+1}] f_{sigm}'(u_{ij}^l) \quad (25)$$

$e_{i(j)}^l$ is the i-th element of error vector $e_j^l$ for layer l, and $h_{ik(n)}^{l+1}$ is the element of matric $H_n^{l+1}$ in i-th row and k-th column for layer l+1.

In the recognition stage of VODNN-based speech recognition, the output of each hidden layer is calculated according to equation (21) with the estimated, measured, or calculated environment variable, e.g., SNR. The output of top layer, i.e., the senone posterior, is calculated according to equations (4) and (2) with the environment independent parameters $W^L$ and $b^L$.

As shown in FIG. 4, representing the framework of one layer of a VODNN, an input vector 402 is received by the weighting functions, represented by weighting function indicators 404A-C, respectively. While only three weighting functions are depicted, the number of weighting functions in such a depiction is dependent on the selected polynomial order, J, as indicated in the weighting function indicator 404C. Each represented weighting function indicator 404A-C, respectively, represents an evaluation at a particular j value from j=0 to j=J. Following the weighting functions, the results of the weighting functions are evaluated by the activation functions, represented by activation function indicators 406A-C, respectively. The results of the evaluation by the activation functions are multiplied, as indicated by multiplication indicators 408A-C, by the jth power of respective environment variable v (e.g. $v^j$), as indicated the environment variable indicators 410A-C. The results from each level, from j=0 to j=J, are then summed, as indicated by summation indicator 412. The summed results are utilized to produce an output vector 414. As will be appreciated by those having skill in the art, FIG. 4 illustrates only one layer in the VODNN, and, in embodiments, many additional layers are utilized.

Figure 5:
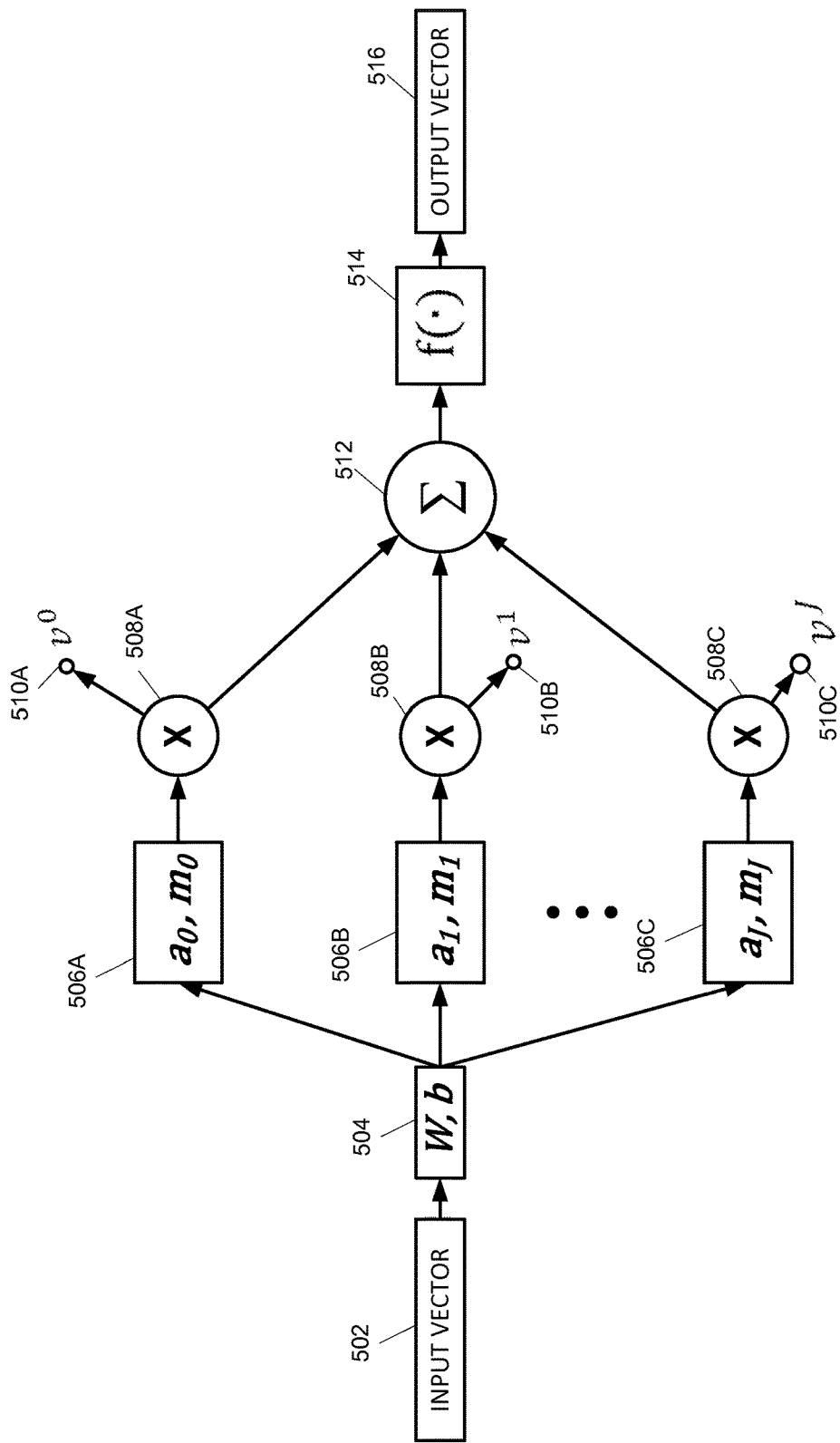
FIG. 5 depicts a flowchart for one layer in a VADNN.

FIG. 5 depicts a flowchart for one layer in a VADNN, in which the activation function of the DNN nodes has environment-variable-dependent parameters. For example, each node of the hidden layers uses the sigmoid function:

$$f_{sigm}(x) = 1/(1+e^x) \quad (26)$$

With VADNN-based speech recognition, the sigmoid function has the general form $$f_{sigm}(x) = 1/(1+e^{ax+m}) \quad (27)$$

For each node n at layer l, both $a_n^l$ and $m_n^l$ are environment-variable dependent:

$$a_n^l = \Sigma_{j=0}^J c_{nj}^l v^j \quad (28)$$

$$m_n^l = \Sigma_{j=0}^J d_{nj}^l v^j \quad (29)$$

$c_{nj}^l$ and $d_{nj}^l$ can be obtained with the error back propagation algorithm as below $$\hat{c}_j^l = c_j^l + \alpha(e^l \circ u^l) v^j \quad (30)$$

$$\hat{d}_j^l = d_j^l + \alpha e^l v^j \quad (31)$$

As shown in FIG. 5, an input vector 502 is received by the weighting functions, represented by weighting function indicator 504. The coefficients of the element-wise linear transform (e.g., ax+m) are determined for levels j=0 to j=J. The determined coefficients are then multiplied, as indicated by multiplication indicators 508A-C, by the jth power of respective environment variable v (e.g. $v^j$), as indicated the environment variable indicators 510A-C. The results from each level, from j=0 to j=J, are then summed, as indicated by summation indicator 512. The summed results are received by the activation function represented by activation function indicator 514. Following evaluation of the activation function, an output vector 516 is produced. As will be appreciated by those having skill in the art, FIG. 5 illustrates only one layer in the VADNN, and, in embodiments, many additional layers are utilized.

In embodiments, the environment variable v, such as SNR, may be normalized for both VPDNN, VODNN, and VADNN because the environment variable's numerical value range is often too large compared with the respective DNN component. For example, a sigmoid function may be used for the purpose of environment variable normalization. The sigmoid function not only narrows the numerical value range but also makes the impact of very high SNR on environments similar. That would be reasonable since, for example, 40 dB and 60 dB SNR does not make obvious differences in speech recognition. The same logic also applies to the very low SNR cases.

Figure 6:
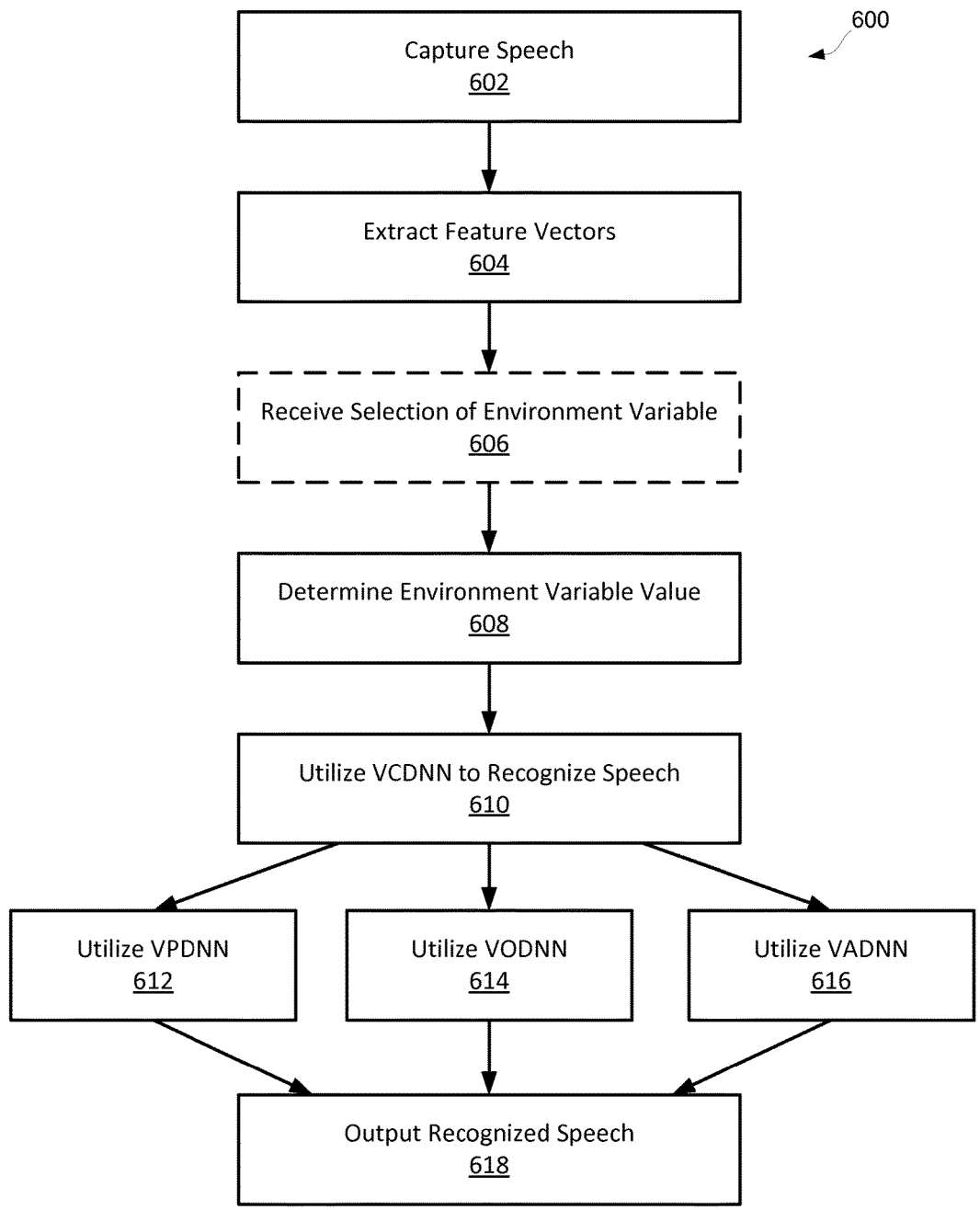
FIG. 6 depicts a method for VCDNN-based speech recognition.

FIG. 6 depicts a method for speech recognition utilizing VCDNN-based speech recognition. While the methodology is shown and described as being a series of acts that are performed in a sequence, it is to be understood and appreciated that the methodology is not limited by the order of the sequence. For example, some acts can occur in a different order than what is described herein, as will be appreciated by those skilled in the art. In addition, some acts can occur concurrently with another act. For example, the adjustment of the statistical weights may occur concurrently with the processing of the recognized word by the application. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

As depicted in FIG. 6, at operation 602 speech is captured. The speech may be captured by the speech capture device 202. At operation 604, feature vectors may be extracted from the captured speech. The feature vectors may be extracted by feature extraction module 204. At optional operation 606, a selection of an environment variable may be received. For example, a user may select an environment variable to be utilized in the VCDNN-based speech recognition. As another example, a computer application may also indicate an environment variable to be utilized. In other embodiments, no selection is necessary and a default environment variable, such as SNR, is utilized. At operation 608, the value or values for the environment variable is determined. The determination of the environment variable may be performed by the environment variable module 206. In embodiments, the environment variable is continuously measured, or components of the environment variable are continuously measured. For example, where the environment variable is SNR, the background noise may be continuously measured for each speech frame.

At operation 610, a VCDNN is utilized to recognize speech uttered by the user. In embodiments, only one type of VCDNN is utilized to recognize the speech, as indicated by separate paths for operation 612, operation 614, and operation 616. As such, in those embodiments only one illustrated path is taken. For example, at operation 612, VPDNN-based speech recognition is utilized to recognize speech. In another example, at operation 614, VODNN-based speech recognition is utilized to recognize speech. In yet another example, at operation 616, VADNN-based speech recognition is utilized to recognize speech. In such embodiments, only one of a VPDNN, a VODNN, and a VADNN is utilized to recognize speech.

Upon recognizing the speech, the recognized speech is produced at operation 618. The recognized speech output may be received by an application, such as application 212. The application then processes the recognized speech in a manner dependent on the type of application. For example, where the application determines that the recognized speech is a command, the application will respond to the command. In another example, where the application is a speech-to-text application, the application may display the recognized speech in text form.

The methods and systems disclosed herein also shown favorable results. The proposed methods have been evaluated with Aurora 4 (as discussed in N. Parihar and J. Picone, "Aurora working group: DSR front end LVCSR evaluation AU/384/02," Tech. Rep., Institute for Signal and Information Processing, Mississippi State Univ., 2002), a noise-robust medium-vocabulary task based on Wall Street Journal corpus (WSJ0). Aurora 4 has two training sets: clean and multi-condition. Each of them consists of 7138 utterances (about 14 hours of speech data). For the multi-condition training set, half of the data was recorded with a Sennheiser microphone and the other was with a secondary microphone. Additionally, 6 types of noises (car, babble, restaurant, street, airport, and train) were added with SNRs from 10 to 20 dB. The subset recorded with the Sennheiser microphone was called as channel wv1 data and the other part as channel wv2 data.

The test set contained 14 sub sets. Two of them were clean and the other 12 were noisy. The noisy test sets were recorded with the same types of microphone as in the multi-condition training set. Also, the same 6 types of noise as in the multi-condition training set were added with SNRs between 5 and 15 dB.

The acoustic feature of the baseline CD-DNN-HMM system was 24-dimensional log Mel filter-bank features plus their first- and second-order derivative features, totaling 72 dimensions. The dimension of the DNN input layer was 792, formed from a context window of 11 frames. Its output layer contained 1209 units, meaning there were 1209 senones in the HMM system. The DNN had 5 hidden layers with 2048 units in each layer.

In the experiments, the VCDNN-based speech recognition's performance was examined in terms of the order of the polynomial. Both standard DNN and VCDNN were trained with the wv1 data from the multi-condition training set. The test data was clean and 6 noisy wv1 sub sets. The results are reproduced in Table 1 below, which shows the first-order VPDNN and VODNN-based speech recognition achieved 6.53% and 5.92% relative word error rate reduction (WERR) over the standard DNN, respectively. However the second-order and third-order VCDNN did not show substantial gain compared with the first order one. That result indicates that the first-order polynomial may be a good option to model the variation caused by SNR changes within the DNN framework, especially where computing resources may be limited. As such, the first-order polynomial was utilized for the following experiments. Given that VPDNN-based speech recognition performed slightly better than VODNN-based speech recognition under the test conditions, the following results focus on VPDNN-based speech recognition.

Table 2, below, shows the breakdown results for different noise conditions and SNRs of first order VPDNN-based speech recognition. It can be seen that VPDNN-based speech recognition substantially outperformed standard DNN-based speech recognition for all kinds of noise except car noise. Further, VPDNN-based speech recognition received even better results (8.47% relative WERR) in unseen SNR conditions (from 5 dB to 10 dB) compared with the seen conditions (>10 dB). That result indicates that standard DNN-based speech recognition has power to model the various environments it has seen, but for the unseen environments, the VPDNN-based speech recognition performed much better. The similar result was also observed for VODNN-based speech recognition (7.08% relative WERR for 5 dB<SNR<10 dB, 4.26% relative WERR for SNR>10 dB).

TABLE 1

The performance of VCDNN in terms of the order of polynomial

| WER(%) | VPDNN | VODNN |
|---|---|---|
| 0 order (standard DNN) | 10.26 | 10.26 |
| $1^{st}$ order | 9.59 | 9.65 |
| $2^{nd}$ order | 9.58 | 9.63 |
| $3^{rd}$ order | 9.58 | 9.62 |

TABLE 2

Breakdown results for first-order VPDNN

| | 5 dB-10 dB | | >10 dB | |
|---|---|---|---|---|
| WER (%) | standard DNN | VPDNN | standard DNN | VPDNN |
| Clean | — | — | 6 | 5.3 |
| Street | 16.19 | 14.67 | 8.89 | 9.00 |
| Babble | 13.46 | 11.72 | 7.63 | 7.32 |
| Airport | 12.72 | 11.44 | 8.2 | 8.08 |
| Train | 15.96 | 14.53 | 8.6 | 8.49 |
| Car | 6.13 | 6.1 | 5.67 | 5.67 |
| restaurant | 18.94 | 17.89 | 9.12 | 8.67 |
| Average | 13.85 | 12.68 | 7.52 | 7.23 |
| Relative WERR(%) | | 8.47% | | 3.79% |

TABLE 3

Comparison of standard DNN and first-order VPDNN with different sizes

| WER (%) | 2048 units/ hidden layer | 1024 units/ hidden layer |
|---|---|---|
| standard DNN | 10.26 | 10.50 |
| VPDNN | 9.59 | 9.93 |

Finally, VCDNN-based speech recognition's performance was examined with fewer parameters using VPDNN-based speech recognition. VPDNN with 1024 units for each hidden layer was evaluated to compare with the standard DNN with 2048 units per hidden layer. The results are given in Table 3, above. Evaluated with all the test sets with wv1 data, the first-order VPDNN with 1024 units per hidden layer achieved 3.22% relative WERR compared with the standard DNN with 2048 units per hidden layer, while the computational and memory costs were reduced by half.

Figure 7:
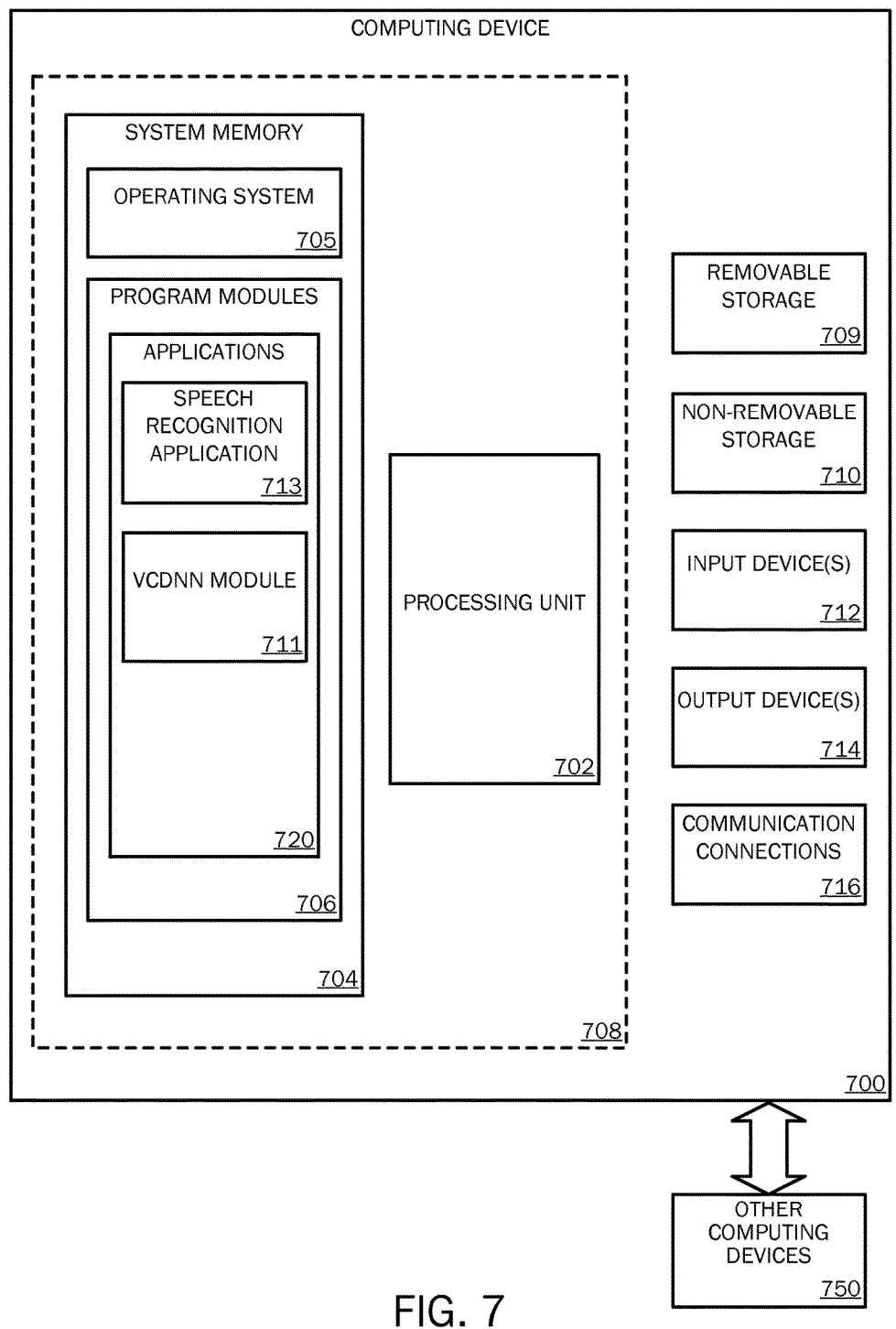
FIG. 7 is a block diagram illustrating example physical components of a computing device with which embodiments of the disclosure may be practiced.

FIG. 7 is a block diagram illustrating physical components (e.g., hardware) of a computing device 700 with which embodiments of the disclosure may be practiced. The computing device components described below may have computer executable instructions for a speech recognition application 713, e.g., of a client and/or computer executable instructions for VCDNN module 711, e.g., of a client, that can be executed to employ the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as VCDNN-speech recognition as discussed with regard to FIGS. 1-6 and, in particular, speech recognition application 713 or VCDNN module 711. Speech recognition application 713 may include applications such as application 212. The VCDNN module 711 and speech recognition application 713 may include many of the features depicted in FIG. 1. The operating system 705, for example, may be suitable for controlling the operation of the computing device 700. Furthermore, embodiments of the disclosure may be practiced in conjunction with a graphics library, audio library, speech database, speech synthesis applications, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., VCDNN module 711 or speech recognition application 713) may perform processes including, but not limited to, the examples and embodiments, as described herein. Other program modules that may be used in accordance with embodiments of the present disclosure, and in particular to generate screen content and audio content, may include electronic mail and contacts applications, word processing applications, spreadsheet applications, database applications, slide presentation applications, drawing, messaging applications, mapping applications, speech-to-text applications, text-to-speech applications, and/or computer-aided application programs, intelligent personal assistant applications, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. Such input devices may be utilized in conjunction with or in place of speech capture device 202. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal. Computer storage media may be stored, incorporated into, or utilized in conjunction with computer storage devices.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
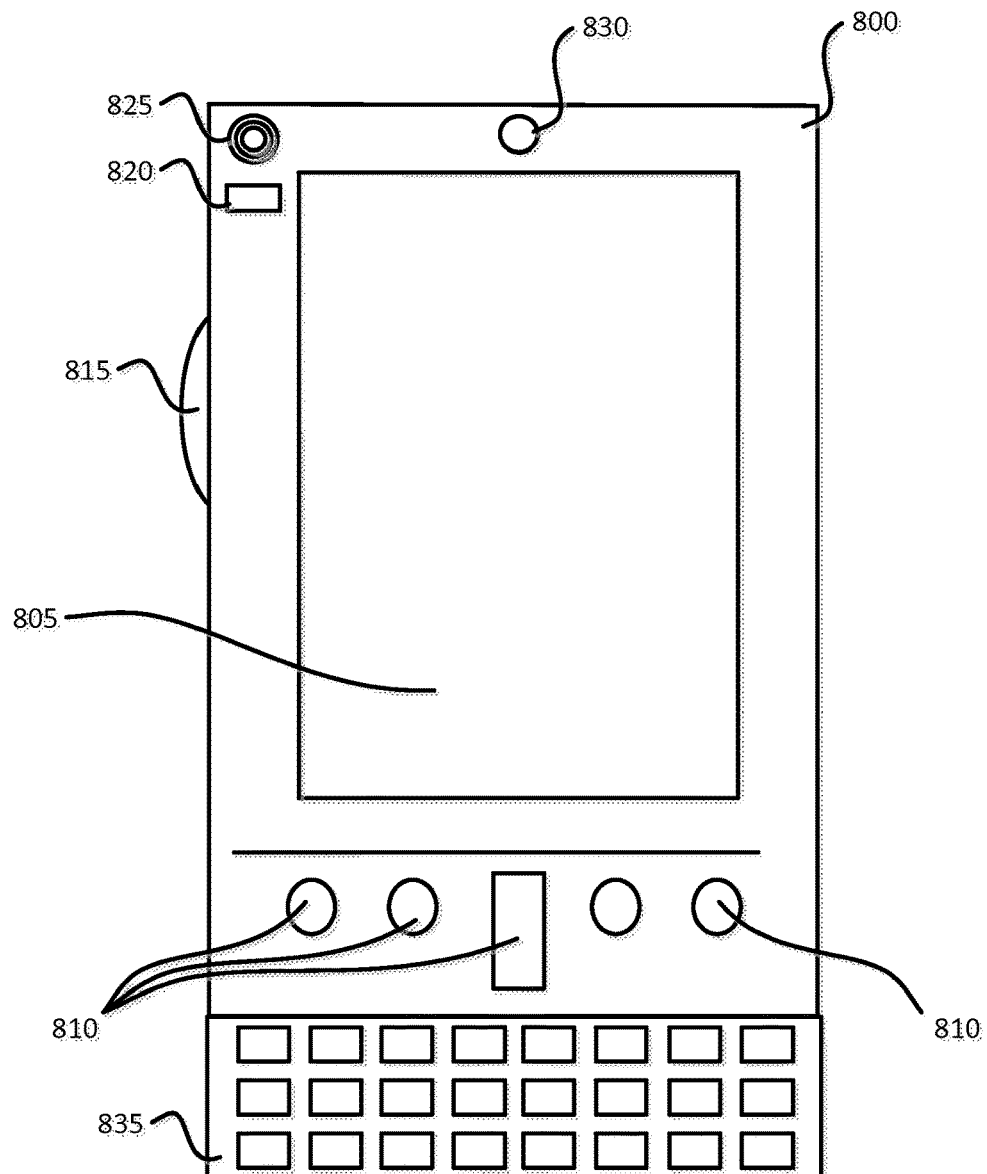
FIGS. 8A and 8B are simplified block diagrams of a mobile computing device with which embodiments of the present disclosure may be practiced.
Figure 8B:
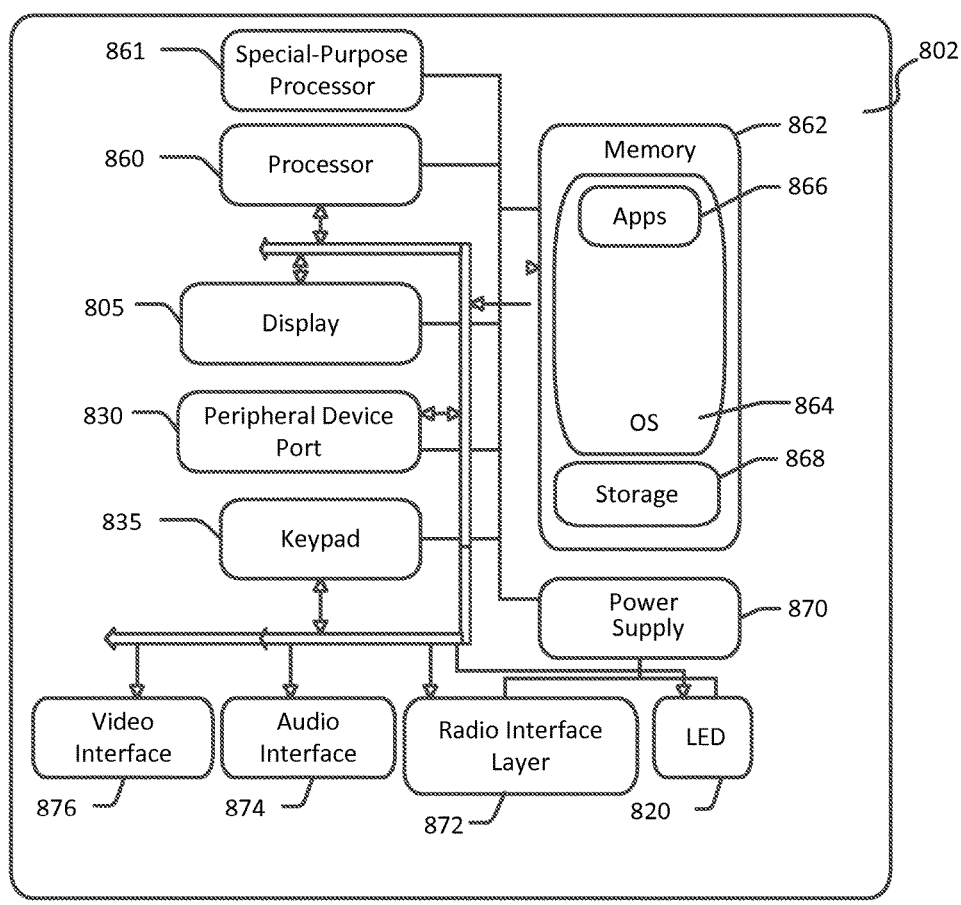

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some embodiments, the client may be a mobile computing device. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 may incorporate a system (e.g., an architecture) 802 to implement some embodiments. In one embodiment, the system 802 is implemented as a "smart phone" capable of running one or more applications (e.g., browser, e-mail, calendaring, contact managers, messaging clients, games, text-to-speech applications, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, text-to-speech applications, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to recognize speech utilizing VCDNN-based speech recognition (e.g., and/or optionally VCDNN module 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation or capture speech for speech recognition. In accordance with embodiments of the present disclosure, the microphone may also serve as an audio sensor to facilitate control of notifications. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
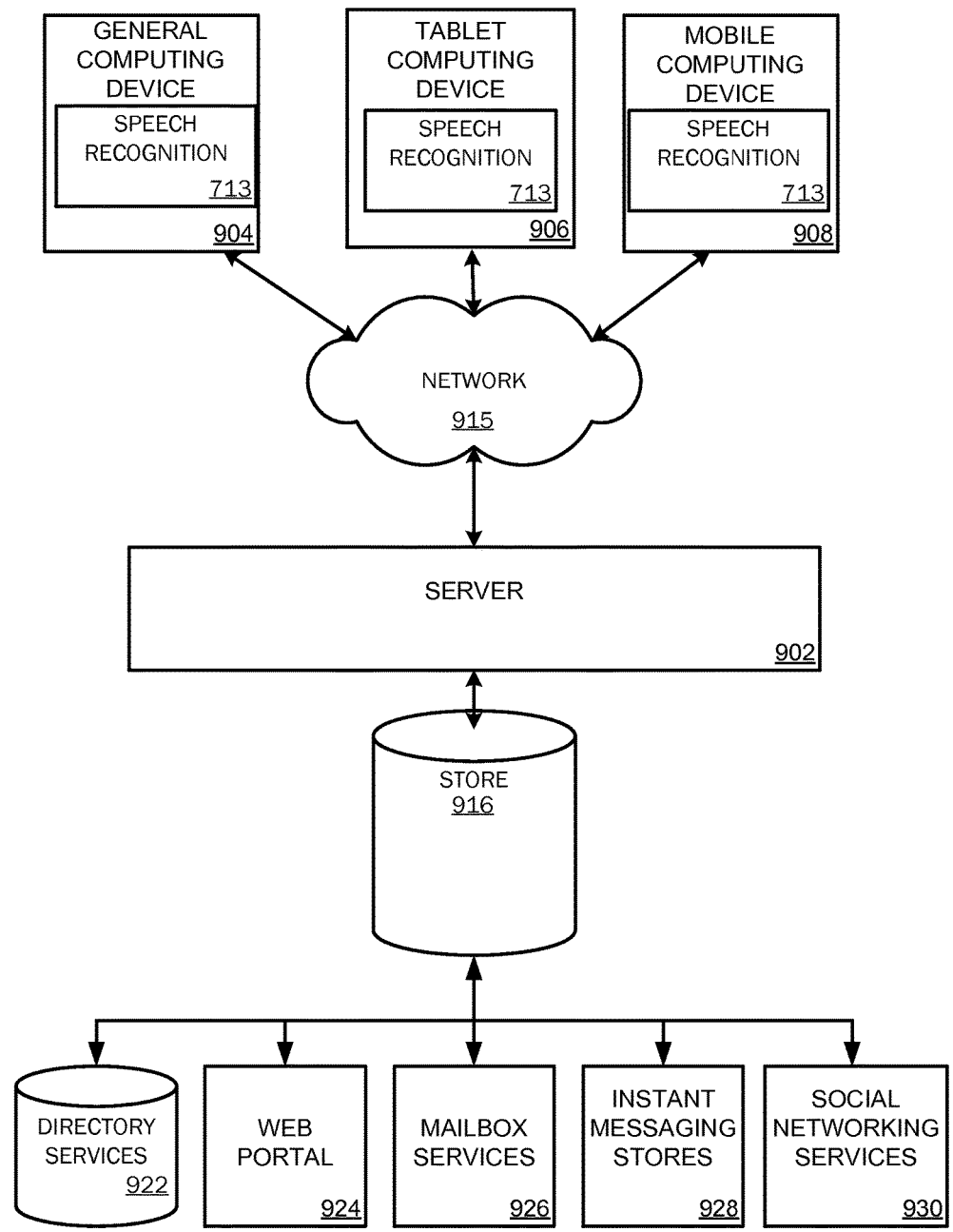
FIG. 9 is a simplified block diagram of a distributed computing system in which embodiments of the present disclosure may be practiced.

FIG. 9 illustrates one embodiment of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The speech recognition application 713 may be employed by a client who communicates with server 902. The server 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
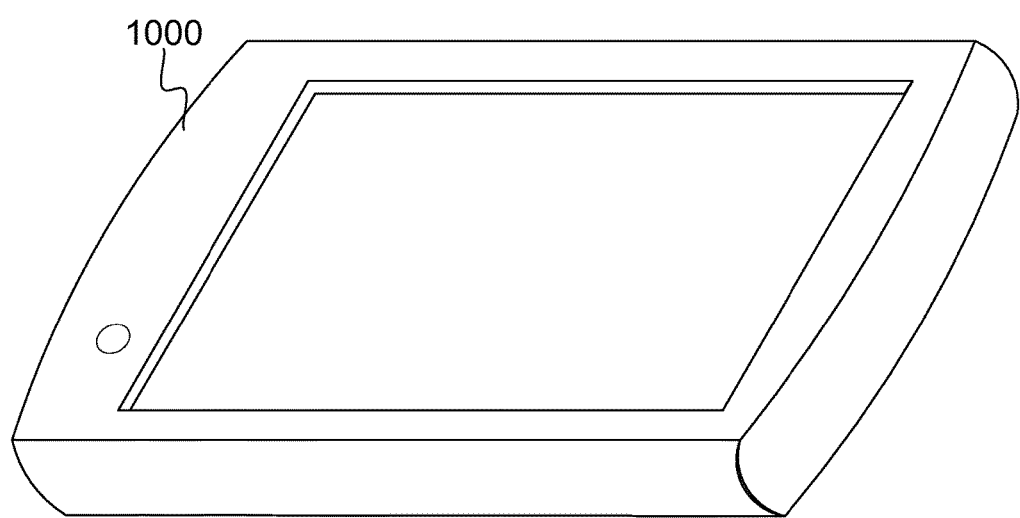
FIG. 10 illustrates a tablet computing device for executing one or more embodiments of the present disclosure.

FIG. 10 illustrates an exemplary tablet computing device 1000 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In addition, to protect the privacy of the user, any aggregation of potentially confidential data of or from a user or resulting from the input of a user may first be anonymized prior to being utilized in the systems and methods disclosed herein. Such anonymization may include the removal of some or all metadata or other data that may connect the results to be utilized to the individual user. The level of desired anonymization may be selected or customized by the user.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. Further, the terms "exemplary" and "illustrative" are meant only to be indicative of examples, and not to designate one example necessarily being more useful or beneficial over any other example. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A method for recognizing speech, the method comprising:
   capturing speech input in an environment by a physical sensor on a device;
   determining a value for an environment variable related to the environment in which the speech was captured;
   receiving the speech input and the value of the environment variable as inputs into a variable component deep neural network (VCDNN) having one or more weighting matrices, one or more biases, at least one hidden layer having a one or more outputs, and one or more activation functions of one or more nodes, wherein at least one of the one or more weighting matrices, the one or more biases, the one or more outputs of the hidden layer, and the one or more activation functions are modeled as a function of the environment variable;
   executing the function based on the speech input and the value of the environment variable;
   generating an output vector from the VCDNN for speech input based on executing the function; and
   producing an output of recognized speech, by the device, based on the function generated output vector for the speech input.

2. The method of claim 1, wherein the one or more weighting matrices and one or more biases of the VCDNN are modeled as the function of the environment variable.

3. The method of claim 1, wherein the one or more outputs of the hidden layer of the VCDNN are modeled as the function of the environment variable.

4. The method of claim 1, wherein the one or more activation functions of one or more nodes in the VCDNN are modeled as the function of the environment variable.

5. The method of claim 1, wherein the environment variable is based on a noise of an environment.

6. The method of claim 5, wherein the environment variable is a signal-to-noise ratio.

7. A system for recognizing speech in an environment, the system comprising:
   a physical sensor to capture speech;
   at least one processor;

memory storing instructions that, when executed by the one or more processors, performs a set of operations comprising:

extract a set of feature vectors for speech captured the physical sensor;

determine a value for an environment variable related to the environment in which the speech was captured;

receiving as input into a speech input from the speech capture device and environment variable as inputs into a variable component deep neural network (VCDNN) having one or more weighting matrices, one or more biases, at least one hidden layer having a one or more outputs, and one or more activation functions of one or more nodes, wherein at least one of the one or more weighting matrices, the one or more biases, the one or more outputs of the hidden layer, and one or more activation functions are modeled as a function of the environment variable are modeled as a function of the environment variable;

generating an output vector from the VCDNN for the captured speech based on the function of the environment variable; and executing an action by an application based on the output vector of the VCDNN.

8. The system of claim 7, wherein the one or more weighting matrices and one or more biases of the VCDNN are modeled as the function of the environment variable.

9. The system of claim 7, wherein the one or more outputs of a hidden layer of the VCDNN are modeled as the function of the environment variable.

10. The system of claim 7, wherein the one or more activation functions of one or more nodes in the VCDNN are modeled as the function of the environment variable.

11. The system of claim 7, wherein the environment variable is based on a noise of an environment.

12. The system of claim 11, wherein the environment variable is a signal-to-noise ratio.

13. A method for recognizing speech, the method comprising:

receiving speech input in an environment by a physical sensor on a device;

receiving a value for an environment variable relating to the environment in which the speech was captured;

generating one or more feature vectors for the received speech input;

receiving the environment variable value as input into a plurality of components in a variable component deep neural network (VCDNN) including at least one of one or more weighting matrices, one or more biases, at least one hidden layer having a one or more outputs, and one or more activation functions of one or more nodes, wherein each of the plurality of components includes one or more polynomial functions of the environment variable and the number of components is based on the polynomial function order;

generating an output vector for the one or more feature vectors for the received speech input based at least on executing the one or more polynomial functions; and executing an action by an application on the device based at least on the output vector.

14. The method of claim 13, wherein the VCDNN is a variable parameter deep neural network (VPDNN), a variable output deep neural network (VODNN), or a variable activation deep neural network (VADNN).

15. The method of claim 14, wherein the VCDNN is a VPDNN and each of the plurality of components is a weighting matrix and a bias of the VPDNN.

16. The method of claim 14, wherein the VCDNN is a VODNN and each of the plurality of components is an output of a hidden layer of the VODNN.

17. The method of claim 14, wherein the VCDNN is a VADNN and each of the plurality of components is an activation function in the VADNN.

18. The method of claim 13, further comprising receiving a selection of the environment variable, from a plurality of environment variables, to be used in the VCDNN.

19. The method of claim 13, wherein the value for the environment variable is a scalar value that is measured at a time when the speech is captured.

20. The method of claim 13, wherein the environment variable is at least one of a speaking rate, a distance from a microphone, an angle from which the speech input is received, an age of a speaker, and a vocal tract length of a speaker.

* * * * *